(12) United States Patent  
Zhang et al.

(10) Patent No.: US 9,306,666 B1  
(45) Date of Patent: Apr. 5, 2016

(54) PROGRAMMING PROTOCOLS FOR POWERED CARDS AND DEVICES

(75) Inventors: Brian Zhang, Pittsburgh, PA (US); Bruce S. Cloutier, Jeannette, PA (US); L. Casimir Mostowy, Jr., Pittsburgh, PA (US)

(73) Assignee: DYNAMICS INC., Pittsburgh, PA (US)

( * ) Notice: Subject to any disclaimer, the term of this patent is extended or adjusted under 35 U.S.C. 154(b) by 720 days.

(21) Appl. No.: 12/890,111

(22) Filed: Sep. 24, 2010

Related U.S. Application Data

(60) Provisional application No. 61/249,692, filed on Oct. 8, 2009, provisional application No. 61/287,366, filed on Dec. 17, 2009.

(51) Int. Cl.
*H04B 10/00* (2013.01)
*H04B 10/11* (2013.01)
*H04B 10/114* (2013.01)

(52) U.S. Cl.
CPC .............. *H04B 10/11* (2013.01); *H04B 10/114* (2013.01); *H04B 10/1141* (2013.01)

(58) Field of Classification Search
CPC ... H04B 10/11; H04B 10/114; H04B 10/1141
USPC ........................................................ 398/129
See application file for complete search history.

(56) References Cited

U.S. PATENT DOCUMENTS

| | | | |
|---|---|---|---|
| 4,353,064 A | 10/1982 | Stamm | |
| 4,394,654 A | 7/1983 | Hofmann-Cerfontaine | |
| 4,614,861 A | 9/1986 | Pavlov et al. | |
| 4,667,087 A | 5/1987 | Quintana | |
| 4,701,601 A | 10/1987 | Francini et al. | |
| 4,720,860 A | 1/1988 | Weiss | |
| 4,786,791 A | 11/1988 | Hodama | |
| 4,791,283 A | 12/1988 | Burkhardt | |
| 4,797,542 A | 1/1989 | Hara | |
| 5,038,251 A | 8/1991 | Sugiyama et al. | |
| 5,168,520 A | 12/1992 | Weiss | |
| 5,237,614 A | 8/1993 | Weiss | |

(Continued)

FOREIGN PATENT DOCUMENTS

JP 05210770 A 8/1993
WO WO9852735 11/1998

(Continued)

OTHER PUBLICATIONS

U.S. Appl. No. 60/594,300, Poidomani et al.

(Continued)

*Primary Examiner* — Daniel Dobson

(57) ABSTRACT

A programming device is provided that programs cards, such as payment cards, with data, such as personal data, using light transmitters and receivers. For example, an infrared transmitter may be provided to program personal data (e.g., a customer's credit card number) into a card wirelessly. In doing so, the card may be, for example, completely laminated such that there are no exposed electronic components on the exterior surface of the card and be programmed via light. The programming device may shield the programming components to block ambient light from interacting with those programming components during programming. A conveyor may be utilized to align multiple cards with a programming device to allow assembly-line style programming of the cards.

19 Claims, 11 Drawing Sheets

(56) References Cited

U.S. PATENT DOCUMENTS

| | | |
|---|---|---|
| 5,276,311 A | 1/1994 | Hennige |
| 5,347,580 A | 9/1994 | Molva et al. |
| 5,361,062 A | 11/1994 | Weiss et al. |
| 5,412,199 A | 5/1995 | Finkelstein et al. |
| 5,434,398 A | 7/1995 | Goldberg |
| 5,434,405 A | 7/1995 | Finkelstein et al. |
| 5,478,994 A | 12/1995 | Rahman |
| 5,479,512 A | 12/1995 | Weiss |
| 5,484,997 A | 1/1996 | Haynes |
| 5,485,519 A | 1/1996 | Weiss |
| 5,585,787 A | 12/1996 | Wallerstein |
| 5,591,949 A | 1/1997 | Bernstein |
| 5,608,203 A | 3/1997 | Finkelstein et al. |
| 5,623,552 A | 4/1997 | Lane |
| 5,657,388 A | 8/1997 | Weiss |
| 5,834,747 A | 11/1998 | Cooper |
| 5,834,756 A | 11/1998 | Gutman et al. |
| 5,856,661 A | 1/1999 | Finkelstein et al. |
| 5,864,623 A | 1/1999 | Messina et al. |
| 5,907,142 A | 5/1999 | Kelsey |
| 5,913,203 A | 6/1999 | Wong et al. |
| 5,937,394 A | 8/1999 | Wong et al. |
| 5,955,021 A | 9/1999 | Tiffany, III |
| 5,956,699 A | 9/1999 | Wong et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Haynes, III et al. |
| 6,176,430 B1 | 1/2001 | Finkelstein et al. |
| 6,182,894 B1 | 2/2001 | Hackett et al. |
| 6,189,098 B1 | 2/2001 | Kaliski |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,256,873 B1 | 7/2001 | Tiffany, III |
| 6,269,163 B1 | 7/2001 | Rivest et al. |
| 6,286,022 B1 | 9/2001 | Kaliski et al. |
| 6,308,890 B1 | 10/2001 | Cooper |
| 6,313,724 B1 | 11/2001 | Osterweil |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,764,005 B2 | 7/2004 | Cooper |
| 6,769,618 B1 | 8/2004 | Finkelstein |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,873,974 B1 | 3/2005 | Schutzer |
| 6,902,116 B2 | 6/2005 | Finkelstein |
| 6,970,070 B2 | 11/2005 | Juels et al. |
| 6,975,812 B1 * | 12/2005 | Kuhara et al. .......... 398/21 |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,083,094 B2 | 8/2006 | Cooper |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B2 | 11/2006 | Wong |
| 7,140,550 B2 | 11/2006 | Ramachandran |
| 7,163,153 B2 | 1/2007 | Blossom |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,334,732 B2 | 2/2008 | Cooper |
| 7,337,326 B2 | 2/2008 | Palmer et al. |
| 7,346,775 B2 | 3/2008 | Gasparini et al. |
| 7,356,696 B1 | 4/2008 | Jakobsson et al. |
| 7,357,319 B1 | 4/2008 | Lin et al. |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,530,495 B2 | 5/2009 | Cooper |
| 7,532,104 B2 | 5/2009 | Juels |
| 7,543,739 B2 | 6/2009 | Brown et al. |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,631,804 B2 | 12/2009 | Brown |
| 7,639,537 B2 | 12/2009 | Sepe et al. |
| 7,641,124 B2 | 1/2010 | Brown et al. |
| 7,660,902 B2 | 2/2010 | Graham et al. |
| 7,784,687 B2 | 8/2010 | Mullen et al. |
| 7,793,851 B2 | 9/2010 | Mullen |
| 7,828,207 B2 | 11/2010 | Cooper |
| 7,828,220 B2 | 11/2010 | Mullen |
| 7,931,195 B2 | 4/2011 | Mullen |
| 7,954,705 B2 | 6/2011 | Mullen |
| 8,011,577 B2 | 9/2011 | Mullen et al. |
| 8,020,775 B2 | 9/2011 | Mullen et al. |
| 8,066,191 B1 | 11/2011 | Cloutier et al. |
| 8,074,877 B2 | 12/2011 | Mullen et al. |
| 8,172,148 B1 | 5/2012 | Cloutier et al. |
| 8,282,007 B1 | 10/2012 | Cloutier et al. |
| 8,286,876 B2 | 10/2012 | Mullen et al. |
| 8,302,872 B2 | 11/2012 | Mullen |
| 8,382,000 B2 | 2/2013 | Mullen et al. |
| 8,393,545 B1 | 3/2013 | Mullen et al. |
| 8,393,546 B2 | 3/2013 | Yen et al. |
| 8,413,892 B2 | 4/2013 | Mullen et al. |
| 8,424,773 B2 | 4/2013 | Mullen et al. |
| 8,459,548 B2 | 6/2013 | Mullen et al. |
| 8,485,437 B2 | 7/2013 | Mullen et al. |
| 8,511,574 B1 | 8/2013 | Yen et al. |
| 8,517,276 B2 | 8/2013 | Mullen et al. |
| 8,523,059 B1 | 9/2013 | Mullen et al. |

(56) References Cited

U.S. PATENT DOCUMENTS

| | | | |
|---|---|---|---|
| 8,579,203 B1 | 11/2013 | Lambeth et al. | |
| 8,590,796 B1 | 11/2013 | Cloutier et al. | |
| 8,608,083 B2 | 12/2013 | Mullen et al. | |
| 8,622,309 B1 | 1/2014 | Mullen et al. | |
| 8,668,143 B2 | 3/2014 | Mullen et al. | |
| 8,727,219 B1 | 5/2014 | Mullen | |
| 8,733,638 B2 | 5/2014 | Mullen et al. | |
| 8,757,483 B1 | 6/2014 | Mullen et al. | |
| 8,757,499 B2 | 6/2014 | Cloutier et al. | |
| 8,814,050 B1 | 8/2014 | Mullen et al. | |
| 8,881,989 B2 | 11/2014 | Mullen et al. | |
| 8,931,703 B1 | 1/2015 | Mullen et al. | |
| 8,973,824 B2 | 3/2015 | Mullen et al. | |
| 9,004,368 B2 | 4/2015 | Mullen et al. | |
| 9,010,630 B2 | 4/2015 | Mullen et al. | |
| 9,064,225 B2 | 6/2015 | Nakra et al. | |
| 9,064,255 B1 | 6/2015 | Mullen et al. | |
| 2001/0034702 A1 | 10/2001 | Mockett et al. | |
| 2001/0047335 A1 | 11/2001 | Arndt et al. | |
| 2002/0003169 A1* | 1/2002 | Cooper | 235/492 |
| 2002/0059114 A1 | 5/2002 | Cockrill et al. | |
| 2002/0082989 A1 | 6/2002 | Fife et al. | |
| 2002/0096570 A1 | 7/2002 | Wong et al. | |
| 2002/0120583 A1 | 8/2002 | Keresman, III et al. | |
| 2003/0034388 A1 | 2/2003 | Routhenstein et al. | |
| 2003/0052168 A1 | 3/2003 | Wong | |
| 2003/0057278 A1 | 3/2003 | Wong | |
| 2003/0116635 A1 | 6/2003 | Taban | |
| 2003/0152253 A1 | 8/2003 | Wong | |
| 2003/0163287 A1 | 8/2003 | Vock et al. | |
| 2003/0173409 A1 | 9/2003 | Vogt et al. | |
| 2003/0179909 A1 | 9/2003 | Wong et al. | |
| 2003/0179910 A1 | 9/2003 | Wong | |
| 2003/0226899 A1 | 12/2003 | Finkelstein | |
| 2004/0035942 A1 | 2/2004 | Silverman | |
| 2004/0133787 A1 | 7/2004 | Doughty | |
| 2004/0162732 A1 | 8/2004 | Rahim et al. | |
| 2004/0172535 A1 | 9/2004 | Jakobsson | |
| 2004/0177045 A1 | 9/2004 | Brown | |
| 2005/0043997 A1 | 2/2005 | Sohata et al. | |
| 2005/0080747 A1 | 4/2005 | Anderson et al. | |
| 2005/0086160 A1 | 4/2005 | Wong et al. | |
| 2005/0086177 A1 | 4/2005 | Anderson et al. | |
| 2005/0116026 A1 | 6/2005 | Burger et al. | |
| 2005/0119940 A1 | 6/2005 | Concilio et al. | |
| 2005/0139606 A1* | 6/2005 | Martin et al. | 221/92 |
| 2005/0154643 A1 | 7/2005 | Doan et al. | |
| 2005/0228959 A1 | 10/2005 | D'Albore et al. | |
| 2005/0283272 A1* | 12/2005 | Roberts | 700/231 |
| 2006/0000900 A1 | 1/2006 | Fernandes et al. | |
| 2006/0037073 A1 | 2/2006 | Juels et al. | |
| 2006/0041759 A1 | 2/2006 | Kaliski et al. | |
| 2006/0085328 A1 | 4/2006 | Cohen et al. | |
| 2006/0091223 A1 | 5/2006 | Zellner | |
| 2006/0161435 A1 | 7/2006 | Atef et al. | |
| 2006/0163353 A1 | 7/2006 | Moulette et al. | |
| 2006/0174104 A1 | 8/2006 | Crichton et al. | |
| 2006/0196931 A1 | 9/2006 | Holtmanns et al. | |
| 2006/0256961 A1 | 11/2006 | Brainard et al. | |
| 2007/0034700 A1 | 2/2007 | Poidomani et al. | |
| 2007/0114274 A1 | 5/2007 | Gibbs et al. | |
| 2007/0124321 A1 | 5/2007 | Szydlo | |
| 2007/0152070 A1 | 7/2007 | D'Albore | |
| 2007/0152072 A1 | 7/2007 | Frallicciardi et al. | |
| 2007/0153487 A1 | 7/2007 | Frallicciardi et al. | |
| 2007/0174614 A1 | 7/2007 | Duane et al. | |
| 2007/0192249 A1 | 8/2007 | Biffle et al. | |
| 2007/0241183 A1 | 10/2007 | Brown et al. | |
| 2007/0241201 A1 | 10/2007 | Brown et al. | |
| 2007/0256123 A1 | 11/2007 | Duane et al. | |
| 2007/0291753 A1 | 12/2007 | Romano | |
| 2008/0005510 A1 | 1/2008 | Sepe et al. | |
| 2008/0008315 A1 | 1/2008 | Fontana et al. | |
| 2008/0008322 A1 | 1/2008 | Fontana et al. | |
| 2008/0010675 A1 | 1/2008 | Massacusa et al. | |
| 2008/0016351 A1 | 1/2008 | Fontana et al. | |
| 2008/0019507 A1 | 1/2008 | Fontana et al. | |
| 2008/0028447 A1 | 1/2008 | O'Malley et al. | |
| 2008/0035738 A1 | 2/2008 | Mullen | |
| 2008/0040271 A1 | 2/2008 | Hammad et al. | |
| 2008/0040276 A1 | 2/2008 | Hammad et al. | |
| 2008/0058016 A1 | 3/2008 | Di Maggio et al. | |
| 2008/0059379 A1 | 3/2008 | Ramaci et al. | |
| 2008/0065555 A1 | 3/2008 | Mullen | |
| 2008/0096326 A1 | 4/2008 | Reed | |
| 2008/0126398 A1 | 5/2008 | Cimino | |
| 2008/0128515 A1 | 6/2008 | Di Iorio | |
| 2008/0135631 A1* | 6/2008 | Miller | 235/493 |
| 2008/0148394 A1 | 6/2008 | Poidomani et al. | |
| 2008/0201264 A1 | 8/2008 | Brown et al. | |
| 2008/0209550 A1 | 8/2008 | Di Iorio | |
| 2008/0288699 A1 | 11/2008 | Chichierchia | |
| 2008/0294930 A1 | 11/2008 | Varone et al. | |
| 2008/0302869 A1 | 12/2008 | Mullen | |
| 2008/0302876 A1 | 12/2008 | Mullen | |
| 2008/0302877 A1 | 12/2008 | Musella et al. | |
| 2009/0013122 A1 | 1/2009 | Sepe et al. | |
| 2009/0036147 A1 | 2/2009 | Romano | |
| 2009/0046522 A1 | 2/2009 | Sepe et al. | |
| 2009/0108064 A1 | 4/2009 | Fernandes et al. | |
| 2009/0150295 A1 | 6/2009 | Hatch et al. | |
| 2009/0152365 A1 | 6/2009 | Li et al. | |
| 2009/0159663 A1 | 6/2009 | Mullen et al. | |
| 2009/0159667 A1 | 6/2009 | Mullen et al. | |
| 2009/0159669 A1 | 6/2009 | Mullen et al. | |
| 2009/0159670 A1 | 6/2009 | Mullen et al. | |
| 2009/0159671 A1 | 6/2009 | Mullen et al. | |
| 2009/0159672 A1 | 6/2009 | Mullen et al. | |
| 2009/0159673 A1 | 6/2009 | Mullen et al. | |
| 2009/0159680 A1 | 6/2009 | Mullen et al. | |
| 2009/0159681 A1 | 6/2009 | Mullen et al. | |
| 2009/0159682 A1 | 6/2009 | Mullen et al. | |
| 2009/0159690 A1 | 6/2009 | Mullen et al. | |
| 2009/0159696 A1 | 6/2009 | Mullen | |
| 2009/0159697 A1 | 6/2009 | Mullen et al. | |
| 2009/0159698 A1 | 6/2009 | Mullen et al. | |
| 2009/0159699 A1 | 6/2009 | Mullen et al. | |
| 2009/0159701 A1 | 6/2009 | Mullen et al. | |
| 2009/0159702 A1 | 6/2009 | Mullen | |
| 2009/0159703 A1 | 6/2009 | Mullen et al. | |
| 2009/0159704 A1 | 6/2009 | Mullen et al. | |
| 2009/0159705 A1 | 6/2009 | Mullen et al. | |
| 2009/0159709 A1 | 6/2009 | Mullen | |
| 2009/0159710 A1 | 6/2009 | Mullen et al. | |
| 2009/0159712 A1 | 6/2009 | Mullen et al. | |
| 2009/0159713 A1* | 6/2009 | Mullen et al. | 235/493 |
| 2009/0160617 A1 | 6/2009 | Mullen et al. | |
| 2009/0242648 A1 | 10/2009 | Di Sirio et al. | |
| 2009/0244858 A1 | 10/2009 | Di Sirio et al. | |
| 2009/0253460 A1 | 10/2009 | Varone et al. | |
| 2009/0255996 A1 | 10/2009 | Brown et al. | |
| 2009/0290704 A1 | 11/2009 | Cimino | |
| 2009/0303885 A1 | 12/2009 | Longo | |
| 2009/0308921 A1 | 12/2009 | Mullen | |
| 2011/0028184 A1 | 2/2011 | Cooper | |
| 2011/0272471 A1 | 11/2011 | Mullen | |
| 2011/0272472 A1 | 11/2011 | Mullen | |
| 2011/0272473 A1 | 11/2011 | Mullen et al. | |
| 2011/0272474 A1 | 11/2011 | Mullen et al. | |
| 2011/0272475 A1 | 11/2011 | Mullen et al. | |
| 2011/0272477 A1 | 11/2011 | Mullen et al. | |
| 2011/0272478 A1 | 11/2011 | Mullen | |
| 2011/0272480 A1 | 11/2011 | Mullen et al. | |
| 2011/0272481 A1 | 11/2011 | Mullen et al. | |
| 2011/0272482 A1 | 11/2011 | Mullen et al. | |
| 2011/0276381 A1 | 11/2011 | Mullen et al. | |
| 2011/0276416 A1 | 11/2011 | Mullen et al. | |
| 2011/0276424 A1 | 11/2011 | Mullen | |
| 2011/0276425 A1 | 11/2011 | Mullen | |
| 2011/0278364 A1 | 11/2011 | Mullen et al. | |
| 2011/0282753 A1 | 11/2011 | Mullen et al. | |
| 2012/0286037 A1 | 11/2012 | Mullen et al. | |
| 2012/0318871 A1 | 12/2012 | Mullen et al. | |

(56) References Cited

U.S. PATENT DOCUMENTS

| | | |
|---|---|---|
| 2013/0020396 A1 | 1/2013 | Mullen et al. |
| 2013/0282573 A1 | 10/2013 | Mullen et al. |
| 2013/0282575 A1 | 10/2013 | Mullen et al. |

FOREIGN PATENT DOCUMENTS

| | | |
|---|---|---|
| WO | WO0247019 | 6/2002 |
| WO | WO2006066322 | 6/2006 |
| WO | WO2006080929 | 8/2006 |
| WO | WO2006105092 | 10/2006 |
| WO | WO2006116772 | 11/2006 |
| WO | WO2008064403 | 6/2008 |
| WO | PCT/US11/25047 | 2/2011 |
| WO | PCT/US11/37041 | 5/2011 |
| WO | PCT/US11/45991 | 7/2011 |
| WO | PCT/US12/31919 | 4/2012 |
| WO | PCT/US12/31921 | 4/2012 |
| WO | PCT/US12/37237 | 5/2012 |
| WO | PCT/US13/26746 | 2/2013 |

OTHER PUBLICATIONS

U.S. Appl. No. 60/675,388, Poidomani et al.
The Bank Credit Card Business. Second Edition, American Bankers Association, Washington, D.C., 1996.
A Day in the Life of a Flux Reversal. http://www.phrack/org/issues.html?issue=37&id=6#article. As viewed on Apr. 12, 2010.
Dynamic Virtual Credit Card Numbers. http://homes.cerias.purdue.edu/~jtli/paper/fc07.pdf. As viewed on Apr. 12, 2010.
English translation of JP 05210770 A.

* cited by examiner

PROGRAMMING PROTOCOLS FOR POWERED CARDS AND DEVICES

CROSS-REFERENCE TO RELATED APPLICATION

This application claims the benefit of U.S. Provisional Patent Application No. 61/249,692, titled "Programming with Light for Powered Cards and Devices," filed Oct. 8, 2009 and U.S. Provisional Patent Application No. 61/287,366, titled "Programming Protocols for Powered Cards and Devices," filed Dec. 17, 2009, which are hereby incorporated by reference herein in their entirety.

BACKGROUND OF THE INVENTION

This invention relates to magnetic cards and devices and associated payment systems.

SUMMARY OF THE INVENTION

A card may include a dynamic magnetic communications device. Such a dynamic magnetic communications device may take the form of a magnetic encoder or a magnetic emulator. A magnetic encoder may change the information located on a magnetic medium such that a magnetic stripe reader may read changed magnetic information from the magnetic medium. A magnetic emulator may generate electromagnetic fields that directly communicate data to a magnetic stripe reader. Such a magnetic emulator may communicate data serially to a read-head of the magnetic stripe reader.

All, or substantially all, of the front as well as the back of a card may be a display (e.g., bi-stable, non bi-stable, LCD, LED, or electrochromic display). Electrodes of a display may be coupled to one or more capacitive touch sensors such that a display may be provided as a touch-screen display. Any type of touch-screen display may be utilized. Such touch-screen displays may be operable of determining multiple points of touch. Accordingly, a barcode may be displayed across all, or substantially all, of a surface of a card. In doing so, computer vision equipment such as barcode readers may be less susceptible to errors in reading a displayed barcode.

A card may include a number of output devices to output dynamic information. For example, a card may include one or more RFIDs or IC chips to communicate to one or more RFID readers or IC chip readers, respectively. A card may include devices to receive information. For example, an RFID and IC chip may both receive information and communicate information to an RFID and IC chip reader, respectively. A device for receiving wireless information signals may be provided. A light sensing device or sound sensing device may be utilized to receive information wirelessly. A card may include a central processor that communicates data through one or more output devices simultaneously (e.g., an RFID, IC chip, and a dynamic magnetic stripe communications device). The central processor may receive information from one or more input devices simultaneously (e.g., an RFID, IC chip, dynamic magnetic stripe devices, light sensing device, and a sound sensing device). A processor may be coupled to surface contacts such that the processor may perform the processing capabilities of, for example, an EMV chip. The processor may be laminated over and not exposed such that such a processor is not exposed on the surface of the card.

A card may include one or more light transmitters and light receivers. The light transmitters and receivers may be the same, or different, devices. A light transmitter may be able to transmit visible, infrared, or visible and infrared light. A light transmitter may be able to transmit additional types of light (e.g., ultraviolet light). A light receiver may be able to receive visible, infrared, or visible and infrared light. A light receiver may be able to receive additional types of light (e.g., ultraviolet light). A light transmitter may take the form of, for example, an LED. A light receiver may take the form of, for example, a photo-transistor, photo-diode, or photo-resistor.

A card may include a light transmitter (e.g., an infrared transmitter) about one end of a card and a light receiver (e.g., an infrared receiver) about the opposite end of a card. In doing so, the light transmitter and receiver may be located at a distance from one another (e.g., greater than half an inch, one inch, one and a half inch, two inches, or two and a half inches away from one another) such that the light receiver cannot pick up transmissions from the light transmitter.

For example, a light receiver may be located along about a top edge of a card at a particular distance from one side edge (e.g., 1.067 inches from one side edge). A light transmitter may also be located about the top edge at that same particular distance from the other side edge (e.g., 1.067 inches from the other side edge). Accordingly, a programming fixture may include a light transmitter spaced similarly from a light receiver such that the light receiver of the programming fixture may communicate with the light transmitter of the card and the light transmitter of the programming fixture may communicate with the light receiver of that same card. In this manner, cards may be moved through the programming fixture and stopped in front of the programming fixture for programming. A programming module may be included with multiple programming fixtures such that multiple programming fixtures may simultaneously program cards.

Multiple programming fixtures, for example, may be implemented along a portion of an assembly line. A transport mechanism (e.g., a conveyor belt) may be implemented to carry each card to one or more programming fixtures that may be implemented along an assembly line. In so doing, multiple cards may be carried in a forward and/or reverse direction to one or more programming fixtures of an assembly line. Each card may be programmed by one or more of the programming fixtures of an assembly line.

A personalization machine may include multiple modules (e.g., multiple programming modules) such that cards may be personalized utilizing the personalization machine. For example, a personalization machine may include one or more modules for embossing a card, modules for printing indicia on a card, modules for writing to a static magnetic stripe of a card, modules for reading from a static magnetic stripe of a card, modules for reading and/or writing information to an IC chip (e.g., EMV chip) of a card, modules for reading and/or writing information to a Radio-Frequency Identification Tag of a card, modules for laser engraving to a card, modules for flex-testing a card, modules for placing holograms onto a card, modules for placing protective coatings on a card, modules for optically reading physical information on a card (e.g., a credit card number), and modules for placing a material operable to receive an ink-based signature/mark on a card. The personalization machine may be able to communicate with a remote server to, for example, download information to be programmed into a card. The personalization machine may be able to communicate with a remote server to, for example, upload information confirming data programmed into a card.

A card may include a universal identification number. In this manner, multiple card accounts may be programmed into a card. A universal identification number may be supplied by a card (e.g., via a light transmitter) during programming to identify a universal card number. Such information may be communicated to a remote server, in which one or more multiple card account information (e.g., magnetic stripe data for multiple card accounts), may be communicated to the personalization machine and then communicated to a card via a light transmitter. The magnetic stripe data may be stored in a memory of a card during programming.

Application code may be pre-programmed into the card before programming by the personalization machine such that the application code is programmed when the magnetic stripe data is programmed into the card. Particular magnetic stripe data may then be emulated, for example, through a magnetic emulator located on a card in accordance with the previously programmed application code. Additional data may be stored during programming of magnetic stripe data. For example, information utilized by application code other than magnetic stripe data may be programmed. For example, a particular one or more security codes for a particular universal identification number may be programmed into a card. The remote server may keep track of the one or more security codes programmed into a particular card (e.g., using a universal identification number or a payment card account number such as a credit card number).

Numerous types of light may be utilized to program a card. For example, infrared light of a particular frequency may be utilized. All cards programmed by a particular module may be programmed, for example, utilizing the same frequency of infrared light. Alternatively, for example, different cards may be programmed utilizing different frequencies of light. In doing so, multiple cards may be programmed in close proximity to one another and different frequencies of communication for each card may protect against infrared cross-talk within the programming module. A card may include an identification number (e.g., a universal identification number or a payment card account number such as a credit card account number) that is optically read by a module of a personalization machine.

A remote database may store a pre-programmed infrared communications frequency for a card. Accordingly, the personalization machine may receive the frequency from the remote database. Accordingly, the card and an IR programming module of the personalization machine may each know the frequency of communication without, for example, the need to directly communicate with one another.

Multiple types of data may be communicated to a card. For example, one or more account numbers, expiration dates, user names, and other data (e.g., magnetic stripe track data) may be loaded into a card using communication ports on the card (e.g., IR transmitters and/or receivers).

A protocol is provided for infrared data communication between a programming device and an infrared client device such as a programmable card. The client device may be, for example, a one-time programmable low-power device. The protocol may exhibit a high tolerance for device-dependent operational frequency error, such that a low speed (e.g., 2.4 kbit/s) may be implemented at the infrared physical layer. A factory test feature may be provided such that a client device failure due to parts deviation may be detected during a manufacture production process.

The protocol may include a high security feature such that the communication port of a client device may be disconnected and the programming memory erased permanently after infrared communication. The communication process time may occur within one or more seconds (e.g., 1-2 seconds).

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
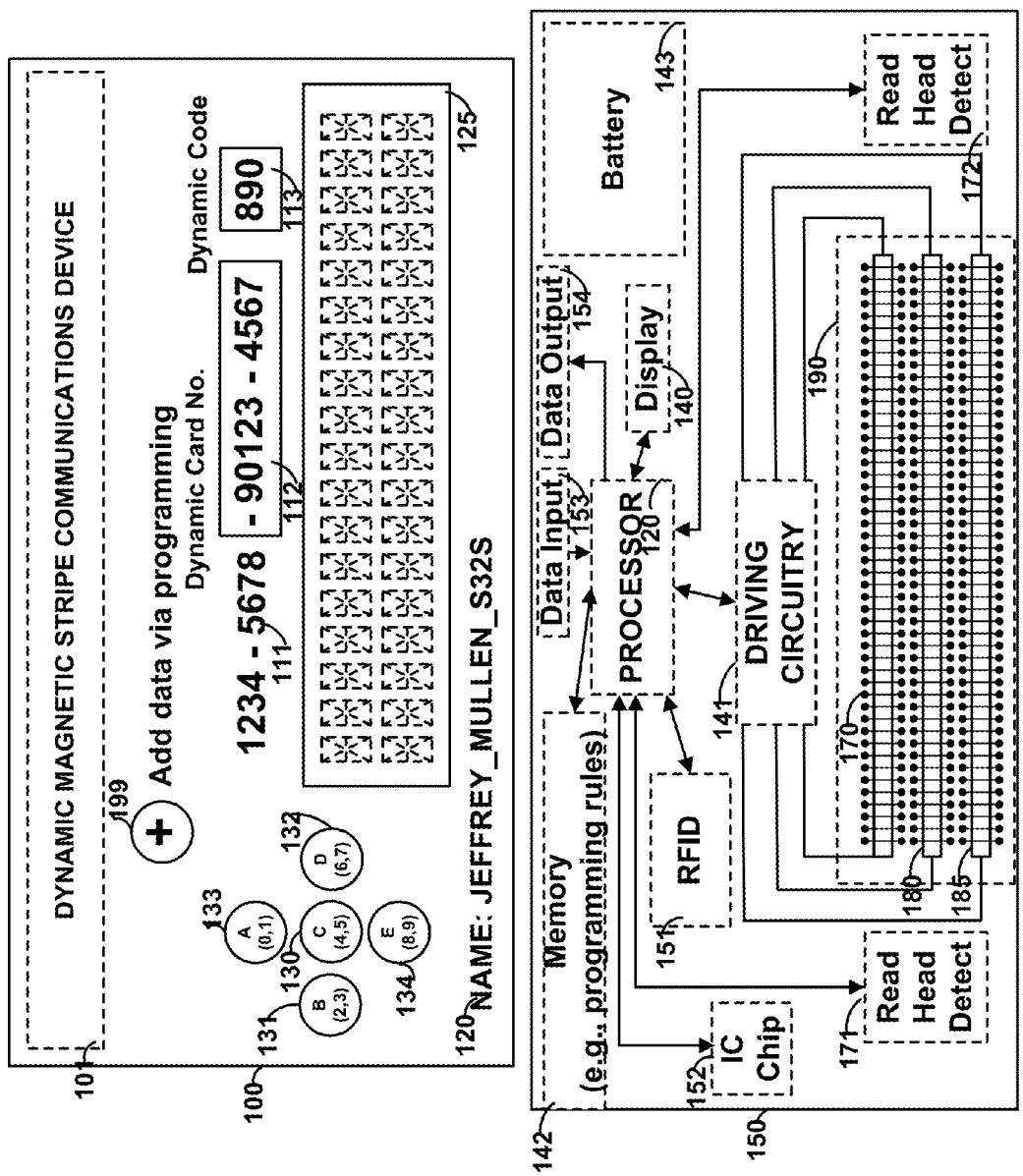
FIG. 1 is an illustration of cards constructed in accordance with the principles of the present invention.

FIG. 1 shows card 100 that may include, for example, a dynamic number that may be entirely, or partially, displayed via display 112. A dynamic number may include a permanent portion such as, for example, permanent portion 111. Permanent portion 111 may be printed as well as embossed or laser etched on card 100. Multiple displays may be provided on a card. For example, display 113 may be utilized to display a dynamic code such as a dynamic security code. Display 125 may also be provided to display logos, barcodes, as well as multiple lines of information. A display may be a bi-stable display or non bi-stable display. Permanent information 120 may also be included and may include information such as information specific to a user (e.g., a user's name or username) or information specific to a card (e.g., a card issue date and/or a card expiration date).

Card 100 may include one or more buttons such as buttons 130-134. Such buttons may be mechanical buttons, capacitive buttons, or a combination of mechanical and capacitive buttons. Card 100 may include button 199. Button 199 may be used, for example, to place card 100 into a programming mode to receive programming (e.g., programming of a user's personal payment card data). A button (e.g., button 199) may be utilized in a variety of ways (e.g., to communicate information through a dynamic magnetic communications device indicative of a user's intent to purchase a particular product with points instead of credit).

Architecture 150 may be utilized with any card. Architecture 150 may include processor 120. Processor 120 may have on-board memory for storing information (e.g., application code). Any number of components may communicate to processor 120 and/or receive communications from processor 120. For example, one or more displays (e.g., display 140) may be coupled to processor 120. Persons skilled in the art will appreciate that components may be placed between particular components and processor 120. For example, a display driver circuit may be coupled between display 140 and processor 120.

Memory 142 may be coupled to processor 120. Memory 142 may include data that is unique to a particular card. For example, memory 142 may store discretionary data codes associated with buttons of card 150. Such codes may be recognized by remote servers to effect particular actions. For example, a code may be stored on memory 142 that causes a non-merchant product to be purchased with points during a merchant transaction. Memory 142 may store loyalty information such as identifying information for a points account (e.g., a points account number) and associated information (e.g., a default preference on how points are earned during a purchase, such as 50% of a purchaser's points is given to the user and 50% of a purchaser's points is used to purchase lottery entries for a lottery that has at least one award of a particular number of points).

Memory 142 may be partially implemented as non-volatile memory. Accordingly, memory 142 may be pre-programmed with, for example, a programming protocol that may define how data (e.g. IR data) may be received by data input 153 and how data (e.g., IR data) may be transmitted by data output 154.

Memory 142 may receive data as received from data input 153 (e.g., an IR receiver). For example, data may be received by memory 142 that may be indicative of a universal identification number associated with card 100. Such a universal identification number may, for example, uniquely identify card 100. Memory 142 may receive data via data input 153 that may represent a security code that may be associated with the universal identification number of card 100.

Memory 142 may provide data, such as a universal identification number associated with card 100, to data output 154. Accordingly, data output 153 (e.g., an IR transmitter) may transmit such a universal identification number to, for example, a personalization machine. The personalization machine may relay the universal identification number to a remote server, which in turn, may respond with personalization data that may be associated with the universal identification number of card 100.

Memory 142 may receive data from data input 153 (e.g., an IR receiver) that may be associated with a universal identification number of card 100. For example, one or more account numbers, user names, discretionary data, and expiration dates may be stored within memory 142. Such data may be provided by card 100, for example, as one or more tracks of magnetic stripe data during a transaction (e.g., a purchase transaction).

Any number of reader communication devices may be included in architecture 150. For example, IC chip 152 may be included to communicate information to an IC chip reader. IC chip 152 may be, for example, an EMV chip. As per another example, RFID 151 may be included to communicate information to an RFID reader. A magnetic stripe communications device may also be included to communicate information to a magnetic stripe reader. Such a magnetic stripe communications device may provide electromagnetic signals to a magnetic stripe reader.

Different electromagnetic signals may be communicated to a magnetic stripe reader to provide different tracks of data. For example, electromagnetic field generators 170, 180, and 185 may be included to communicate separate tracks of information to a magnetic stripe reader. Such electromagnetic field generators may include a coil wrapped around one or more materials (e.g., a magnetic material and/or a non-magnetic material).

Each electromagnetic field generator may communicate information serially to a receiver of a magnetic stripe reader for a particular magnetic stripe track. Read-head detectors 171 and 172 may be utilized to sense the presence of a magnetic stripe reader (e.g., a read-head housing of a magnetic stripe reader). The sensed information may be communicated to processor 120 to cause processor 120 to communicate information serially from electromagnetic generators 170, 180, and 185 to magnetic stripe track receivers in a read-head housing of a magnetic stripe reader. Accordingly, a magnetic stripe communications device may change the information communicated to a magnetic stripe reader at any time.

Processor 120 may, for example, communicate user-specific and card-specific information through RFID 151, IC chip 152, and electromagnetic generators 170, 180, and 185 to card readers coupled to remote information processing servers (e.g., purchase authorization servers). Driving circuitry 141 may be utilized by processor 120, for example, to control electromagnetic generators 170, 180, and 185.

Figure 2:
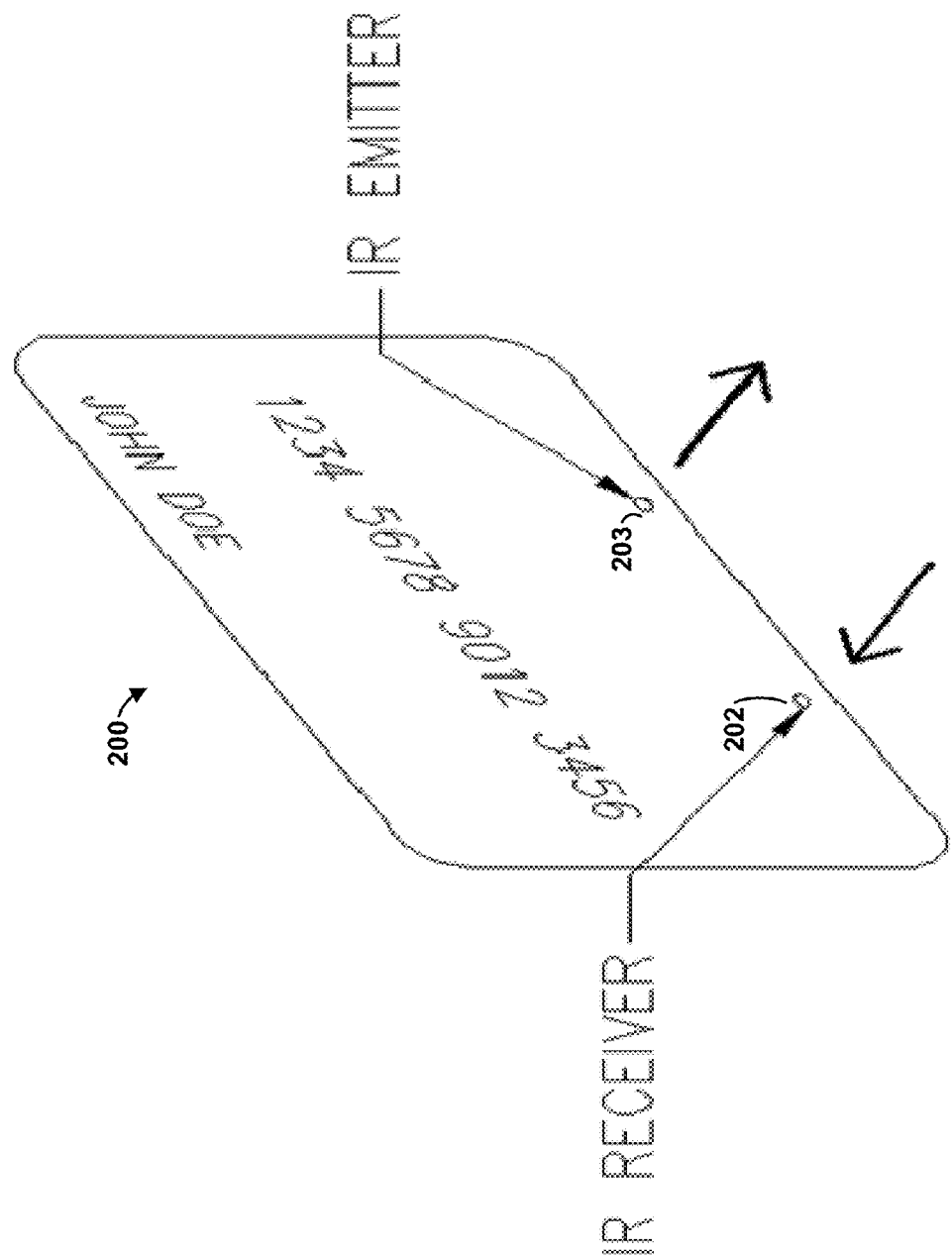
FIG. 2 is an illustration of a card constructed in accordance with the principles of the present invention.

FIG. 2 shows card 200. Cards may include one or more infrared and/or visible light receivers and transmitters to communicate with one or more infrared and/or visible light transmitters and receivers, respectively, that may exist on programming fixtures of programming modules of a personalization machine. Card 200 may include, for example, receiver 202 and transmitter 203 that may be utilized to program card 200 via a personalization machine.

Receiver 202 and transmitter 203 may represent, for example, a non-contact, opto-isolated, bi-directional communications port. Such a communications port may, for example, transmit and receive at differing frequencies so as to reduce interference. For example, signals transmitted by transmitter 203 may be cross-coupled into receiver 202 if the peak wavelength sensitivity of receiver 202 is at or near the peak wavelength emission of transmitter 203. Accordingly, receiver 202 may be implemented with a peak wavelength sensitivity (e.g., 870 nanometers) that may be sufficiently different from the peak wavelength emission (e.g., 940 nanometers) of transmitter 203. Alternate interference reduction methods (e.g., half-duplex communication methods) may also be used. In so doing, a communications port may transmit and receive at the same frequency, but not at the same time so as to reduce interference.

Figure 3:
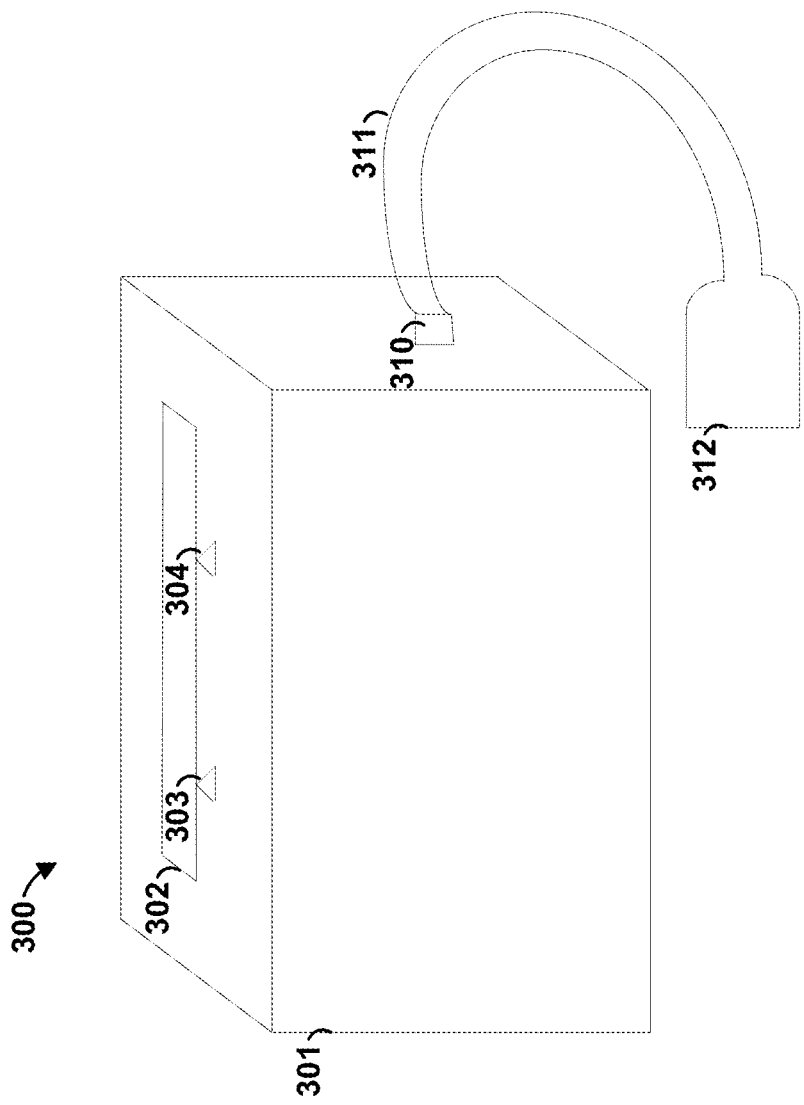
FIG. 3 is an illustration of a programming device constructed in accordance with the principles of the present invention.

FIG. 3 shows programming device 300. Programming device 300 may include housing 301 with slit 302. Slit 302 may be sized to receive all or a portion of a client device (e.g., a powered card). Indicators 303 and 304 may be provided to represent the direction programming ports are to be faced (e.g., infrared programming ports) when a client device is inserted into slit 302. Communications cable 311 may be utilized to couple a device to programming device 300. Such a device may be, for example, a computer that includes data to be programmed onto a client device. Cable 311 may include connector 310 (e.g., mini-USB) for connecting to the circuitry of programming device 300. Cable 311 may include connector 312 (e.g., USB) for connecting to the circuitry of another device.

Initially, programming device 300 may send a sequence of clock pulses (e.g., ten clock pulses) to wake up a client device which may be in a low-power, deep-sleep mode. Once the client device is in communication range (e.g., an IR communication range), the client device may return a sequence of clock pulses to the programming device. Accordingly, the programming device may measure and determine the frequency difference between the clock signal generated by the programming device and the clock signal generated by the client device.

The programming device may verify that the client device's clock frequency is within a specification range. The programming device may send a set of personalization requests containing client's account information and/or other data to the client device based on the client device's clock frequency.

At the end of the personalization sequence, the programming device may send a "terminate" request to the client to terminate the personalization sequence. A "successful" personalization sequence response to the request may be sent by the client device to the programming device, which may constitute the minimum test requirement of the personalization sequence.

The personalization sequence may be time limited. Accordingly, a timeout may be experienced during the personalization sequence if a maximum time limit (e.g., 3-4 seconds) has transpired. A timeout may cause the client device to return to a low-power operational mode to conserve battery energy.

The command messages may be sequenced for maximum user account protection. Accordingly, strict sequencing rules may be applied, such that any sequencing error that may occur during the personalization sequence may cause the client device to return to a low-power operational mode to conserve battery energy and to terminate the personalization sequence. In so doing, any personalization data that may otherwise be transmitted to the client device may instead remain protected within the programming device in the event that an attempt is made to receive unauthorized personalization data from the programming device.

Figure 4:
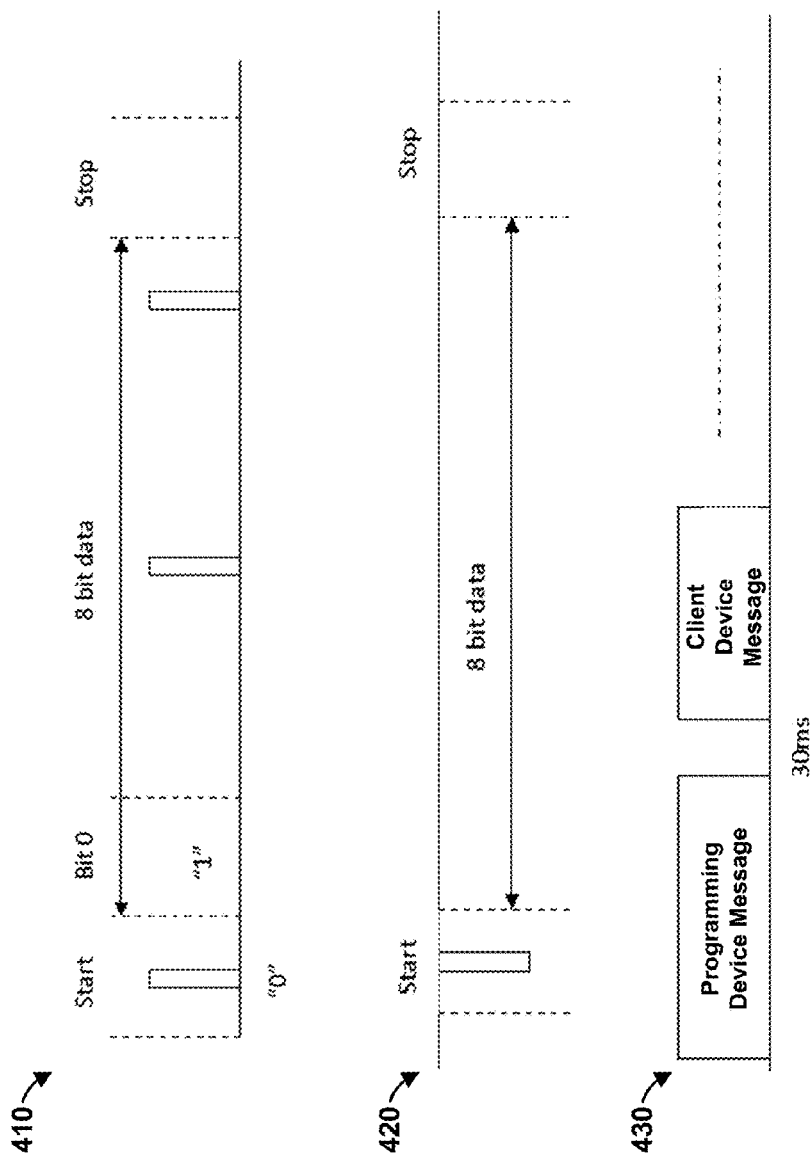
FIG. 4 is an illustration of communications constructed in accordance with the principles of the present invention.

The physical layer of a communications protocol implemented by a programming device may use a pulse width modulation scheme. "Inter-byte" and "inter-message" idle timing may be implemented. The programming device may initiate all requests to the client device within a few seconds (e.g., 1-2 seconds). A delay (e.g., a 30 ms delay) may be implemented in between the exchange of message packets according to, for example, communication 430 of FIG. 4.

The data transmission of a programming device and a client device may use an infrared physical layer protocol. The baud rate may be, for example, approximately 2400 bps, 8-bit data with a start and a stop bit. The start bit may be "0" and the stop bit may be "1". A "0" bit may be represented by a $\frac{3}{16}^{th}$ bit width pulse and "1" bit may be represented by the lack of a pulse. An exemplary byte scheme is shown in communication 410 of FIG. 4. The order of the transmission may be LSB first, 8-bit data followed by a stop bit. A delay (e.g., approximately 5 ms delay) may be allowed between bytes. An idle period (e.g., approximately 30 ms idle time) may be inserted between messages.

The delays, for example, may allow the processor to identify the messages and to provide sufficient time to process the messages. Accordingly, for example, a communication sequence may cause an interrupt to occur in a processor that may be running on the client device and/or the programming device. Delays, therefore, may provide sufficient time to process the interrupt and to execute, for example, a programming sequence in response to the interrupt.

Infrared data reception, for example, may occur as follows. When a byte of data is transmitted from the programming device, a start bit may generate an interrupt in a processor running on the client device. 8-bit data may be shifted, for example, to a data register of the client device at a rate that may be in accordance with a baud rate of data transmission established between the programming device and the client device. A negative $\frac{3}{16}$ bit pulse may correspond to a "0" bit, while a "1" bit may be represented by the lack of a pulse as shown in communication 420 of FIG. 4.

The message structure, for example, may be implemented as follows. Each message may be transmitted with a header (e.g., 0x80) followed by, for example, two bytes that may define a length of the message to follow the header. A 16-bit circular redundancy check (CRC) may be transmitted with the message packet. The CRC may not, for example, be considered as a part of message. It may not, for example, be included in the data length.

| Item | # of Bytes | Content | Defined Values |
| --- | --- | --- | --- |
| 1 | 1 | Start of header | 0x80 |
| 2 | 2 | Length (2 byte) | N - Count of data bytes in the message |
| 3 | N | Message as defined | Variables |
| 4 | 2 | CRC16 (2 byte) | CRC for the above message |

A 16-bit CRC, for example, may be used in the protocol. The CRC value may be generated and may be inserted into the transmission data packet (e.g., at the end of the transmission data packet). At the receiving end (e.g., at the client device) the CRC may be calculated with the corresponding message and compared with the CRC received from the transmitting end (e.g., the programming device). If a CRC error occurs during communication, the entire message may be ignored by the receiving end. Accordingly, the CRC error may be considered as a communication failure. In order to preserve data integrity and user security, the programming device may not retry to send the message.

Message character strings, for example, may include the following.

| | Message Character Strings |
| --- | --- |
| byte | 0x00 to 0xFF (hexadecimal), 0 to 255 (unsigned), −128 to 127 (signed). Used typically for string lengths. |
| short | 2-byte integer value, 0x0000 to 0xFFFF (hexadecimal), 0~65535 (unsigned), −32768 to 32767 (signed). |
| int | 4-byte integer value representing 0x00000000 to 0xFFFFFFFF (hexadecimal), 0 to 4294967295 (unsigned), −2147483648 to 2147483647 (signed) |
| long | 8-byte integer value representing 0x0000000000000000 to 0xFFFFFFFFFFFFFFFF (hexadecimal), 0 to 2^64-1 (unsigned), −2^63 to 2^63-1 (signed). Used typically for absolute time and data. |
| double | 8-byte value in IEEE 754 64-bit double-precision binary floating-point format. |

Byte ordering, for example, may occur as follows. The programming device and client device communication protocol, for example, may utilize big-endian byte ordering. Accordingly, for a 16-bit, 2-byte transmission, the most significant byte may have the lower address order. The lower address byte may be transmitted first.

Clock initialization, for example, may occur as follows. The clock initialization may be designed to wake the client device from a low-power (e.g., deep-sleep) mode of operation. Upon receiving a set of initial clock signals from the programming device, the client device may transmit a data sequence (e.g., 0x000000) to the programming device according to an internal clock rate of the client device. The clock signal may be measured by the programming device, for example, to determine the communication bit rate to be used during subsequent communication with the client device. The programming device may tolerate clock frequency errors and monitor and collect the data for future analysis.

A security password, for example, may be provided as follows. The programming device, for example, may transmit a security password to the client device once the communication rate is determined. The client device, for example, may only respond to communications from the programming device once the correct security password is received and verified by the client device.

The message specification, for example, may be provided as follows. A number of available messages may be provided, where each message may include the application control and user data information. A communication protocol may provide flexibility for implementation, such that it may not be necessary to implement all of the messages at one time. However, each message that may be sent by the programming device may, for example, require an acknowledgement response. Such an acknowledgement response, for example, may contain header information, message length, CRC and message type information. Failure to respond to a request, for example, may result in a communication error. Other requests (e.g., a password request), however, may not require a response.

A protocol implementation may include, for example, a security password request, a write device request, a read device request, and a terminate request. The terminate request, for example, may permanently disable communication to the client device. Other message types, for example, may include the following message types.

| Message Type | Description |
| --- | --- |
| 1 | Password<br>Security password sent to the client device from the programming device for communication validation. |
| 2 | Read Device<br>A request sent by the programming device to the client device to obtain TRACK 1, TRACK 2, and/or TRACK 3 information contained within the client device. |
| 3 | Read Device Response<br>A response sent by the client device to the programming device containing TRACK 1, TRACK 2, and/or TRACK 3 information. |
| 4 | Write Device<br>A request sent to the client device from the programming device to write TRACK 1, TRACK 2, and/or TRACK 3 information. |
| 5 | Write Device Response<br>A response from the client device to a "Write Device" request from the programming device. |
| 6 | Read Battery Information<br>A request sent from the programming device to the client device to obtain battery voltage/capacity information from the client device. |
| 7 | Battery Information Response<br>A response from the client device to a "Read Battery Information" request from the programming device that contains battery voltage and capacity information. |
| 8 | Read Memory<br>A request sent from the programming device to the client device to fetch a memory block from the client device. |

-continued

| Message Type | Description |
| --- | --- |
| 9 | Read Memory Response<br>A response from the client device to a "Read Memory" request from the programming device. |
| 10 | Write Memory<br>A request sent from the programming device to the client device to update a block of memory contained within the client device. |
| 11 | Write Memory Response<br>A response from the client device to a "Write Memory" request from the programming device. |
| 12 | Firmware Version<br>A request sent from the programming device to the client device to obtain a firmware version contained within the client device. |
| 13 | Firmware Version Response<br>A response from the client device to a "Firmware Version" request from the programming device. |
| 14 | Terminate<br>A request sent from the programming device to the client device to terminate communication operation. |
| 15 | Response to Terminate<br>A response from the client device to a "Terminate" request from the programming device. |

Message Type 1, for example, may be directed to the Password. The Password may be sent from the programming device to the client device to initiate communications between the programming device and the client device. This may be a security feature added to the protocol that may not require a response from the client device.

| Item | # of Bytes | Content | Defined Values |
| --- | --- | --- | --- |
| 1 | 1 | Message Type | 0x01 |
| 2 | 1 | N - PASSWORD length (hex) | N (hex) |
| 3 | N | PASSWORD (N bytes in hex) | TBD |

Message Type 2, for example, may be directed to the Read Device request that requests track information that may be contained within the client device. Item fields 2, 3, and/or 4 may specify the request for specific track data information. A value of "0" may be used to indicate that no track information is requested.

| Item | # of Bytes | Content | Defined Values |
| --- | --- | --- | --- |
| 1 | 1 | Message Type | 0x02 |
| 2 | 1 | Track 1 information | Any value. 0, no info. |
| 3 | 1 | Track 2 information | Any value. 0, no info. |
| 4 | 1 | Track 3 information | Any value. 0, no info. |

Message Type 3, for example, may be directed to the Read Device Response from the client device and may be used for read and write verification during personalization of the client device. The client device can provide a "0" in track string length field to indicate that track information is not provided.

| Item | # of Bytes | Content | Defined Values |
| --- | --- | --- | --- |
| 1 | 1 | Message Type | 0x03 |
| 2 | 1 | N - Track 1 character string length (hex) | Any value. 0, no info. |
| 3 | N | Track 1 character string | Any value. |
| 4 | 1 | M - Track 2 character string length (hex) | Any value. 0, no info. |
| 5 | M | Track 2 character string | Any value. |
| 6 | 1 | O - Track 3 character string length (hex) | Any value. 0, no info. |
| 7 | O | Track 3 character string | Any value. |

Message Type 4, for example, may be directed to the Write Device request. This request may be used to write personalization data (e.g., user information) to the client device tracks (e.g., write information to a memory of the card that communicates the information to a dynamic magnetic stripe communications device). Track 1, 2, and/or 3 character string information may be specified in separate item fields.

| Item | # of Bytes | Content | Defined Values |
| --- | --- | --- | --- |
| 1 | 1 | Message Type | 0x04 |
| 2 | 1 | N - Track 1 Character String Length (hex) | Any value. |
| 3 | N | Track 1 Character String (ASCII hex) | Any value. |
| 4 | 1 | M - Track 2 Character String Length (hex) | Any value. |
| 5 | M | Track 2 Character String (ASCII hex) | Any value. |
| 6 | 1 | O - Track 3 Character String Length (hex) | Any value. |
| 7 | O | Track 3 Character String (ASCII hex) | Any value. |

Message Type 5, for example, may be directed to the Write Device Response and may be the client device response to Message Type 4.

| Item | # of Bytes | Content | Defined Values |
| --- | --- | --- | --- |
| 1 | 1 | Message Type | 0x05 |
| 2 | 1 | Track 1 String Character Length Written (hex) | Length written Track 1 |
| 3 | 1 | Track 2 String Character Length Written (hex) | Length written Track 2 |
| 4 | 1 | Track 3 String Character Length Written (hex) | Length written Track 3 |

Message Type 6, for example, may be directed to a Read Battery Information request that may request battery information from the client device. An option field, for example, may define a battery type for which battery voltage and/or capacity information may be requested.

| Item | # of Bytes | Content | Defined Values |
| --- | --- | --- | --- |
| 1 | 1 | Message Type | 0x06 |
| 2 | 1 | Option | 0x00 |

Message Type 7, for example, may be directed to a Battery Information Response that may include a 12-bit battery voltage value and a battery-type option field to indicate a battery type that may correspond to the battery voltage value.

| Item | # of Bytes | Content | Defined Values |
| --- | --- | --- | --- |
| 1 | 1 | Message Type | 0x07 |
| 2 | 2 | Battery Voltage 12-bit A/D Value (hex) | 12-bit A/D |
| 3 | 1 | Option (battery type) | 0x00 |

Message Type 8, for example, may be directed to a Read Memory request and may be the request sent by the programming device to the client device for specific memory blocks. The Read Memory request may be used for test purposes (e.g., to verify data previously written into a memory block of the client device). A Read Memory request for undesignated and/or unauthorized memory information may be denied.

| Item | # of Bytes | Content | Defined Values |
| --- | --- | --- | --- |
| 1 | 1 | Message Type | 0x08 |
| 2 | 2 | N - Length of Memory to Read (byte) | |
| 3 | 2 | Address of Memory (2 byte in hex) | Address of Memory |

Message Type 9, for example, may be directed to a Read Memory response, which may be designated for test verification purposes. For example, only information from a designated memory block, as defined by the client device, may be accessible. A return value of "0" may indicate that the Read Memory request is rejected.

| Item | # of Bytes | Content | Defined Values |
| --- | --- | --- | --- |
| 1 | 1 | Message Type | 0x09 |
| 2 | 2 | N - Length of Memory Read | 0, info request rejected. |
| 3 | N | N bytes of Memory Contents (hex) | Memory contents |

Message Type 10, for example, may be directed to a Write Memory request, which may be a request to write a block of data to client device memory. The length and address may be specified in the request. The client card device may reject the Write Memory request to protect the client device memory area.

| Item | # of Bytes | Content | Defined Values |
| --- | --- | --- | --- |
| 1 | 1 | Message Type | 0x0A |
| 2 | 2 | N - Length of Memory to Write (2 bytes) | |
| 3 | 2 | Address of Memory (2 bytes) | Address of Memory |

Message Type 11, for example, may be directed to a Write Memory Response. The client device may respond to the Write Memory request with the length of memory written, where a value of "0" may indicate that the request is rejected.

| Item | # of Bytes | Content | Defined Values |
|---|---|---|---|
| 1 | 1 | Message Type (byte) | 0x0B |
| 2 | 2 | N - Length of Memory Written (2 bytes) | Length of memory written |

Message Type 12, for example, may be directed to a Firmware Version request, which may request the version of firmware currently being executed by the client device. The Firmware Version request may also request hardware information associated with the client device firmware.

| Item | # of Bytes | Content | Defined Values |
|---|---|---|---|
| 1 | 1 | Message Type (byte) | 0x0C |

Message Type 13, for example, may be directed to a Firmware Version Response. The client device may respond, for example, with one byte of hexadecimal version code corresponding to its embedded firmware and hardware revision. The client device may respond, for example, with an application number that may define a specific type of client device. A status field may be provided, for example, that may indicate an operational status (e.g., battery capacity) of the client device.

| Item | # of Bytes | Content | Defined Values |
|---|---|---|---|
| 1 | 1 | Message Type (byte) | 0x0D |
| 2 | 1 | Version Number (byte) | Version Number |
| 3 | 1 | Application Number | Any value |
| 4 | 1 | Status | Any value |

Message Type 14, for example, may be directed to a Terminate request. The programming device may send a Terminate request to the client device, for example, to terminate the communication process. A Terminate request with option 0x00 may set the client device to a normal mode where no further programming of the client device is possible, but the client device is ready for commercial use. A Terminate request with option 0x01 may set the client device to test mode, whereby personalization data may be transmitted to the client device, but not stored within the client device. A terminate request with option 0x02 may set the client device to test mode, whereby personalization data may be stored within the client device and further programming of the client device may still be possible.

| Item | # of Bytes | Content | Defined Values |
|---|---|---|---|
| 1 | 1 | Message Type (byte) | 0x0E |
| 2 | 1 | Option (0x00 hex, Normal) | 0x00, 0x01, 0x02 |

Message Type 15, for example, may be directed to a Response to Terminate, which may be sent by the client device to the programming device before terminating the communication process. The option status byte may contain the terminating status information. For example, a hexadecimal byte of 0xFF may indicate an error termination.

| Item | # of Bytes | Content | Defined Values |
|---|---|---|---|
| 1 | 1 | Message Type (byte) | 0x0E |
| 2 | 1 | Option (status) | TBD |

Figure 5:
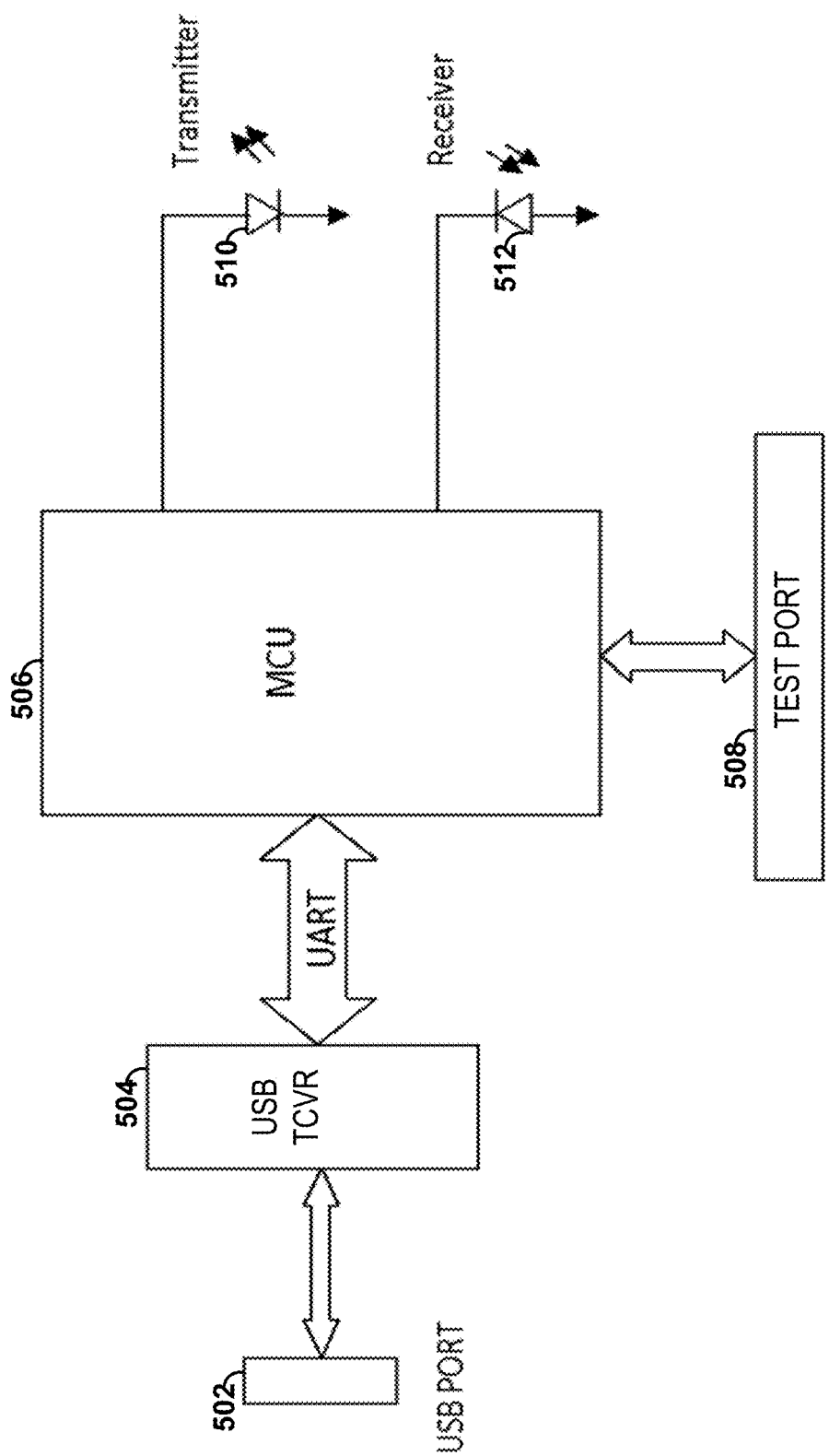
FIG. 5 is an illustration of an architecture constructed in accordance with the principles of the present invention.

FIG. 5 shows architecture 500 of a programming device, which may include a communications port (e.g., USB port 502), a communications transceiver (e.g., USB transceiver 504), test port 508, MCU 506, a transmitter (e.g., IR transmitter 510), and a receiver (e.g., IR receiver 512).

The optical characteristics, for example, of programming device 500 may be as follows. The transmission and/or reception range of programming device 500 may include a relatively short range of distance (e.g., a few centimeters or less than an inch). For example, the reception and transmission range may be approximately less than 10 cm (e.g., approximately 5 mm).

The IR transmitter/IR receiver of the card device may be aligned with the corresponding IR receiver/IR transmitter of the programming device for optimized communication. The IR receivers of the client device and the programming device may be sensitive to ambient light. Accordingly, a sealed environment may be provided to substantially block ambient light from potentially interfering with IR communications between the client device and the programming device. Interference may be reduced, for example, by establishing half-duplex communications between a client device and a programming device.

Interference may be further reduced, for example, by establishing a wavelength sensitivity of the IR receiver that is different than a peak wavelength as transmitted by the IR transmitter. The wavelength sensitivity of the IR receiver may be selected to, for example, 870 nm+/−10 nm. Other parameters that may be exhibited by an IR receiver of a client device and/or a programming device may be as follows.

| Receiver Parameter | Min. | Typ. | Max. | Unit |
|---|---|---|---|---|
| Irradiance in angular range SIR mode | | 110 | | mW/cm$^2$ |
| Peak Wavelength | 860 | 870 | 890 | nm |
| Spectral Radiation Bandwidth | | 45 | | nm |
| Leading edge jitter | | 50 | | ns |
| Latency | | 500 | | us |
| Rise/Fall Time | | 15 | | us |
| Link Distance | | 10 | | mm |

Figure 6:
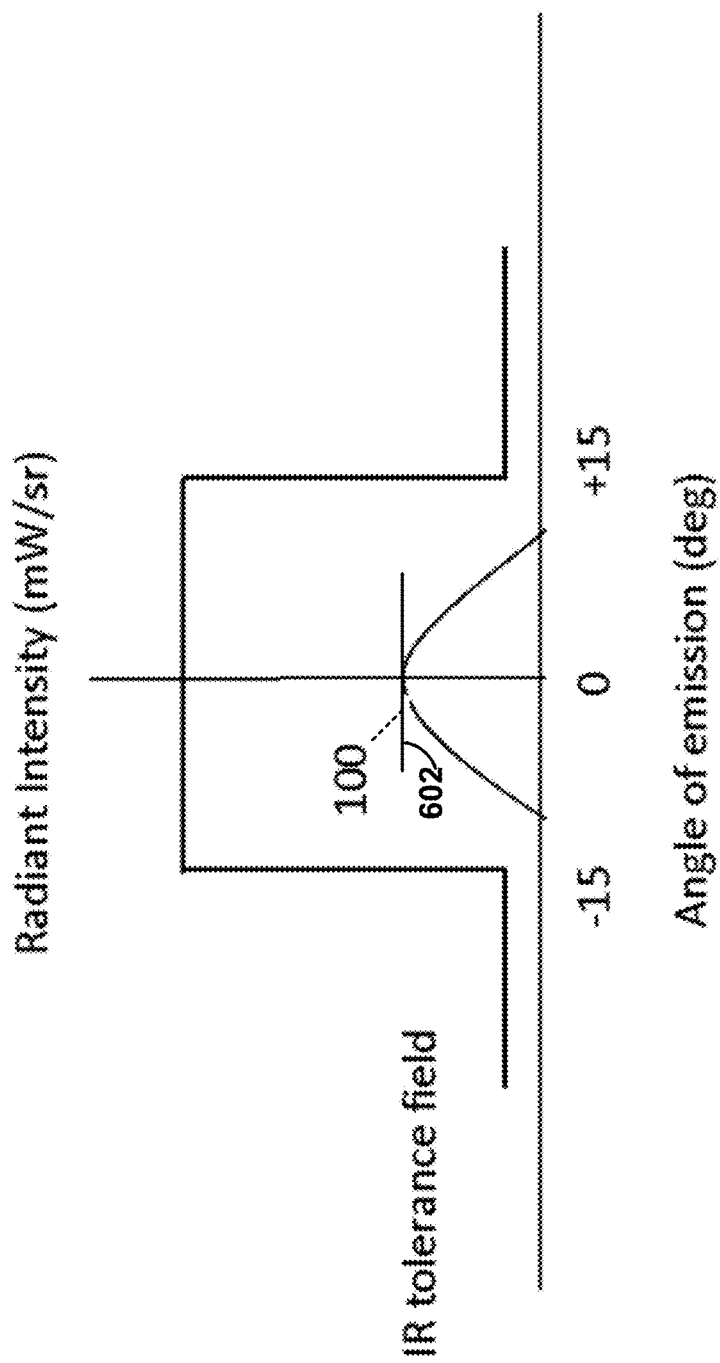
FIG. 6 is an illustration of a radiant intensity constructed in accordance with the principles of the present invention.

FIG. 6 shows radiant intensity graph 600, which may be exhibited by an IR transmitter of a client device and/or a programming device. For example, the radiated power of an IR transmitter may be 100 mW per steradian at, for example, 0 degree transmission angle 602. A peak wavelength of, for example, 940 nm may be utilized by the IR transmitter so that the peak wavelength may be sufficiently different from the peak wavelength sensitivity (e.g., 870 nm) of the IR receiver. Other parameters that may be exhibited by an IR transmitter of a client device and/or a programming device may be as follows.

| Transmitter Parameter | Min. | Typ. | Max. | Unit |
|---|---|---|---|---|
| Radiated Power | | 100 | | mW/sr |
| Peak Wavelength | | 940 | | nm |

-continued

| Transmitter Parameter | Min. | Typ. | Max. | Unit |
|---|---|---|---|---|
| Half Angle | | 15 | | Deg |
| Optical output pulse duration (2.4 kbit/s) | | 80 | | us |
| Rise/Fall Time | | 15 | | us |

Figure 7:
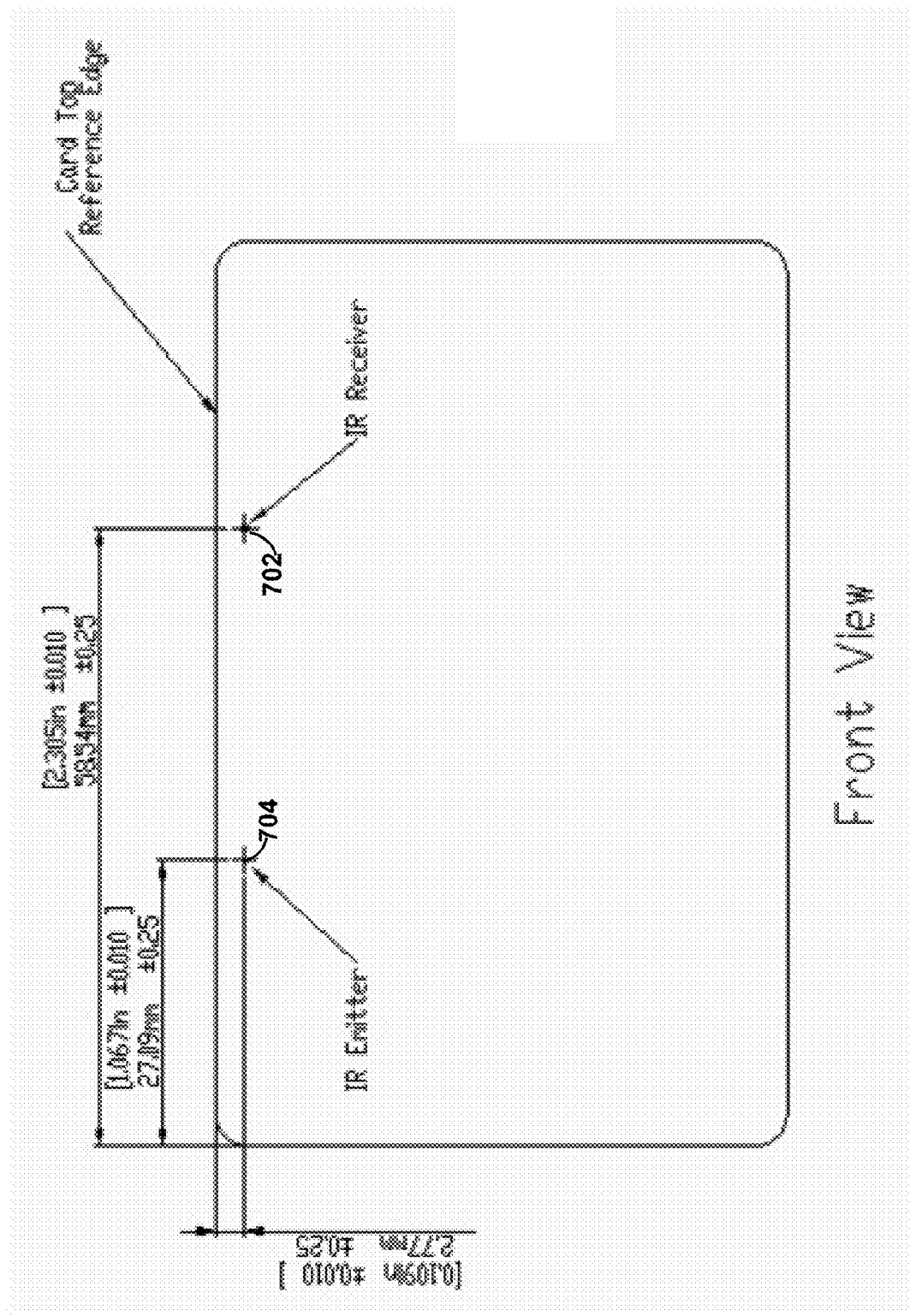
FIG. 7 is an illustration of a card constructed in accordance with the principles of the present invention.

FIG. 7 shows card 700. Card 700 may include an embedded computer consisting of a computing core, embedded memory, and a low-power infrared transceiver, which may include, for example, IR receiver 702 and IR transmitter 704. Card 700 may be programmed (e.g., personalized) by using a bidirectional communication protocol that may program the embedded memory inside card 700 via IR receiver 702 and IR transmitter 704.

Once card 700 has been programmed successfully, the infrared transceiver on the card may be permanently disabled for the remainder of the card's life. Prior to personalization, card 700 may reside in a "wait" state, such that card 700 may be sensitive to all types of light (e.g., infrared light). Accordingly, card 700 may be provided in a dark container and introduced to light only during personalization of card 700.

The IR reactive components (e.g., IR receiver 702 and IR transmitter 704) may be accessible through any surface of card 700. Accordingly, personalization of card 700 may be accomplished through alignment of IR transmitter 704 to a corresponding IR receiver of a programming device and alignment of IR receiver 702 and a corresponding IR transmitter of a programming device. For example, light pipes may be used to align the IR reactive components of card 700 and the corresponding IR reactive components of a programming device.

Figure 8:
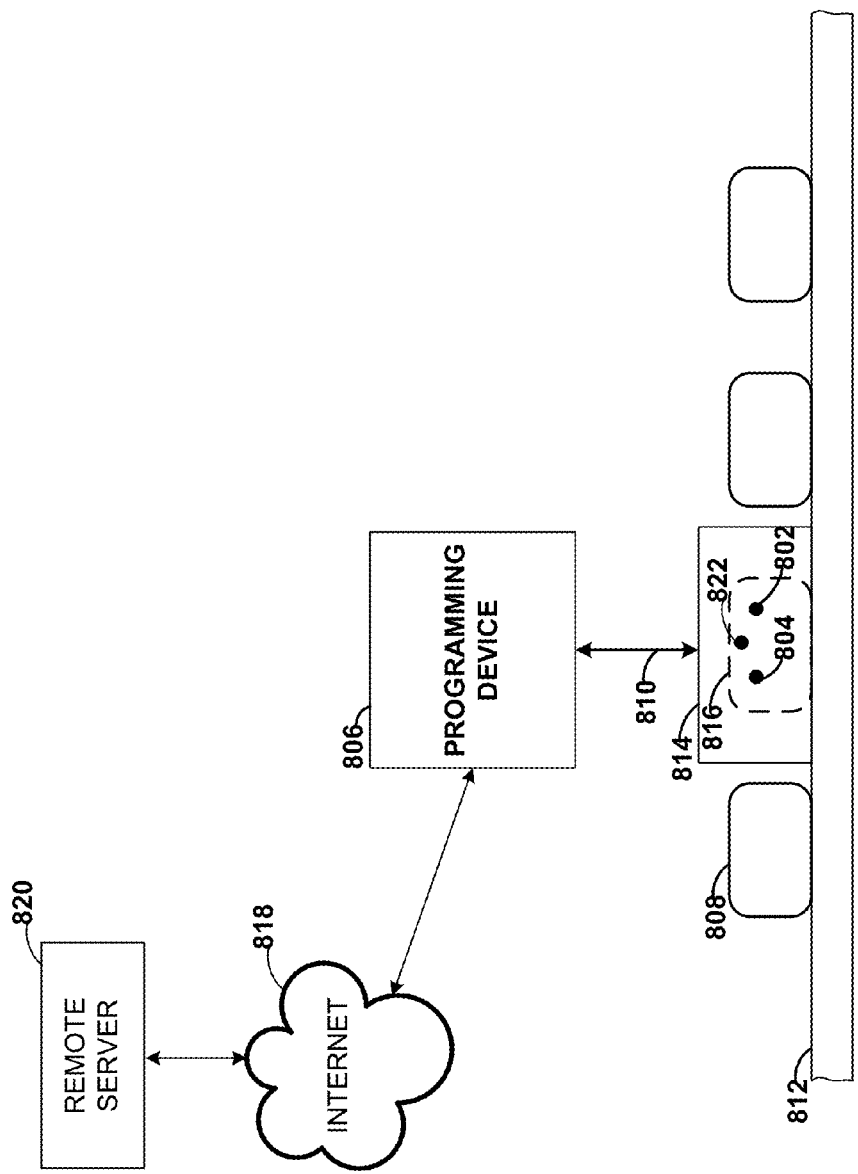
FIG. 8 is an illustration of a personalization system constructed in accordance with the principles of the present invention.

FIG. 8 shows programming system 800. Programming system 800 may include programming device 806, conveyor 812, cards 808, IR device 814, IR transmitter 802, and IR receiver 804. Programming system 800 may be used, for example, for high-volume programming scenarios, whereby several hundreds of cards 808 may be personalized daily by a single programming device 806 in conjunction with a single IR device 814. Persons skilled in the art will appreciate that multiple programming systems 800 working in parallel may be capable of personalizing several tens to several hundreds of thousands of cards 808 per day.

Programming device 806 may include an application programming interface (API) that may be executing within a computing platform of programming device 806. The computing platform may, for example, be executing a high-level windows application that may be used to interface with IR device 814. Accordingly, cards 808 having no user account information may nevertheless be programmed with user account information so as to personalize cards 816 for commercial use. Persons skilled in the art will appreciate that multiple IR devices 814 may be controlled by a single programming device 806 to, for example, further increase a number of cards that may be personalized on a daily basis.

Bidirectional interface 810 may represent a communications medium (e.g., a USB communications medium) whereby card personalization information may be exchanged between programming device 806 and IR device 814. IR device 814 may perform a transceiver operation, whereby communications received from programming device may be converted, for example, to corresponding IR signals and communications received from card 816 may be converted, for example, to USB signals.

Personalization data that may be used to personalize card 816 may be derived from media that may be localized to programming device 806. For example, personalization data may be extracted from a computer readable medium, such as a CD or DVD, by programming device 806 and subsequently programmed into card 816 via IR device 814. Alternately, personalization data may be extracted from a remote server 820 via a network (e.g., the internet) by programming device 806 and subsequently programmed into card 816 via IR device 814.

Cards 808 may be removably attached to conveyor 812. Conveyer 812 may be actuated, for example, such that cards 808 may be sequentially brought within a programming distance of IR device 814. For example, infrared components 802 and 804 on IR device 814 may be closely aligned within 5 mm or less (e.g., within approximately 1.0 mm) of the corresponding components on card 816 via operation of conveyer 812. IR device 814 may utilize sensor 822, which may determine whether IR components of card 816 are properly aligned with the corresponding IR components of IR device 814. Persons skilled in the art will appreciate that conveyer 812 may be actuated in both a forward and reverse direction to bring cards 808 within a programming distance of IR device 814.

The IR receiver on card 816 may be configured, for example, to have a peak wavelength sensitivity of 870 nm. Therefore, corresponding IR transmitter 802 on IR device 814 may be provided so as to closely match the IR receiver specifications of card 816.

The IR transmitter on card 816 may be configured, for example, to have a peak wavelength emission at approximately 940 nanometers. Therefore, corresponding IR receiver 804 of IR device may be provided so as to closely match the IR transmitter specifications of card 816.

A low-level, IR communication schema may be used in the personalization of cards 808. The schema, for example, may be an asynchronous, bidirectional, serial communication method. Communication may occur, for example, at a rate of approximately 2400 bps with no parity error checking, 1 start bit, and 1 stop bit (2400-N-8-1). The start bit, for example, may be zero (0) and the stop bit, for example, may be one (1).

Figure 9:
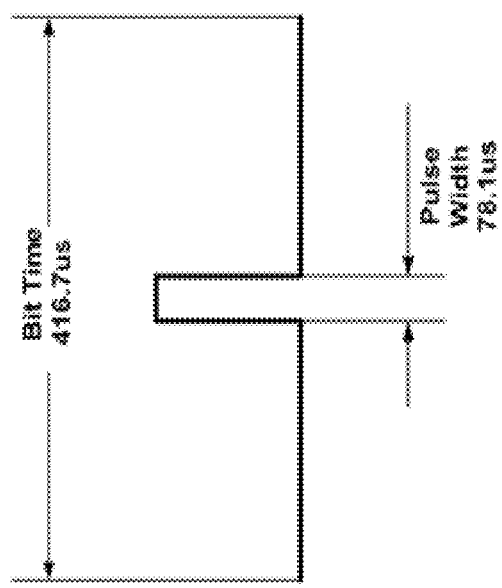
FIG. 9 is an illustration of communications constructed in accordance with the principles of the present invention.
Figure 10:
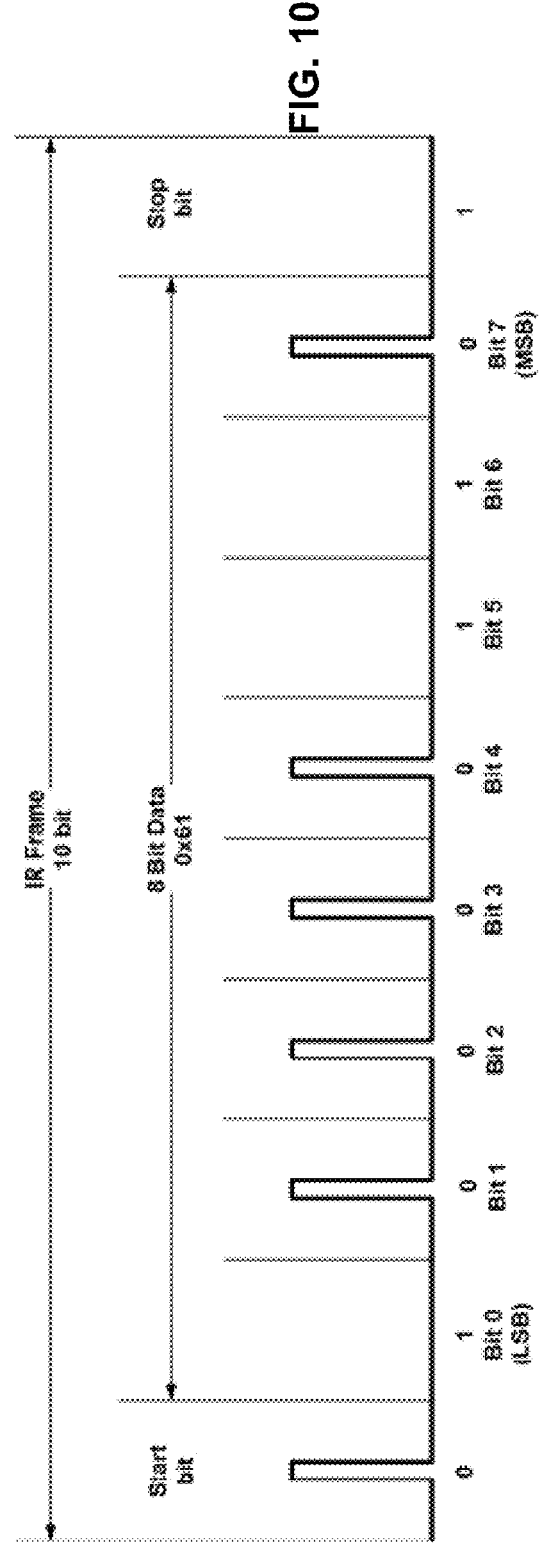
FIG. 10 is an illustration of communications constructed in accordance with the principles of the present invention.

Bit encoding using infrared pulses may be implemented with a common 18% ($3/16^{th}$) duty cycle pulse width scheme as shown in FIG. 9. FIG. 9 shows an example of a transmitted zero (0) bit where the IR pulse width is 78 microseconds (μS) and the entire bit time is 416.7 μS. FIG. 10 shows an example of a typical byte frame that may utilize the pulse width scheme of FIG. 9.

After initial manufacturing, cards 808 may be placed into a low-power, deep-sleep condition. To wake card 816, for example, programming device 806 may send a series of clock pulses (e.g., 10) at a particular rate (e.g., a rate of 600 bits per second) using a 78.1 us infrared pulse encoding scheme. For example, the clock pulses have a bit width, or period, of 1.7 ms and a corresponding infrared pulse width of 78.1 us.

After the initialization sequence (e.g., ten clock pulses) are sent by programming device 806, card 816 may wake up and provide a response (e.g., three bytes of 0x00 at a baud rate of approximately 2400 bps). Since card 816 may not be able to accurately produce a specific baud rate, programming device 806 may nevertheless use the response from card 816 to measure the baud rate produced by card 816. Accordingly, programming device 806 may make any timing adjustments that may be necessary to substantially match the baud rate produced by card 816 so as to improve subsequent communications with card 816.

Figure 11:
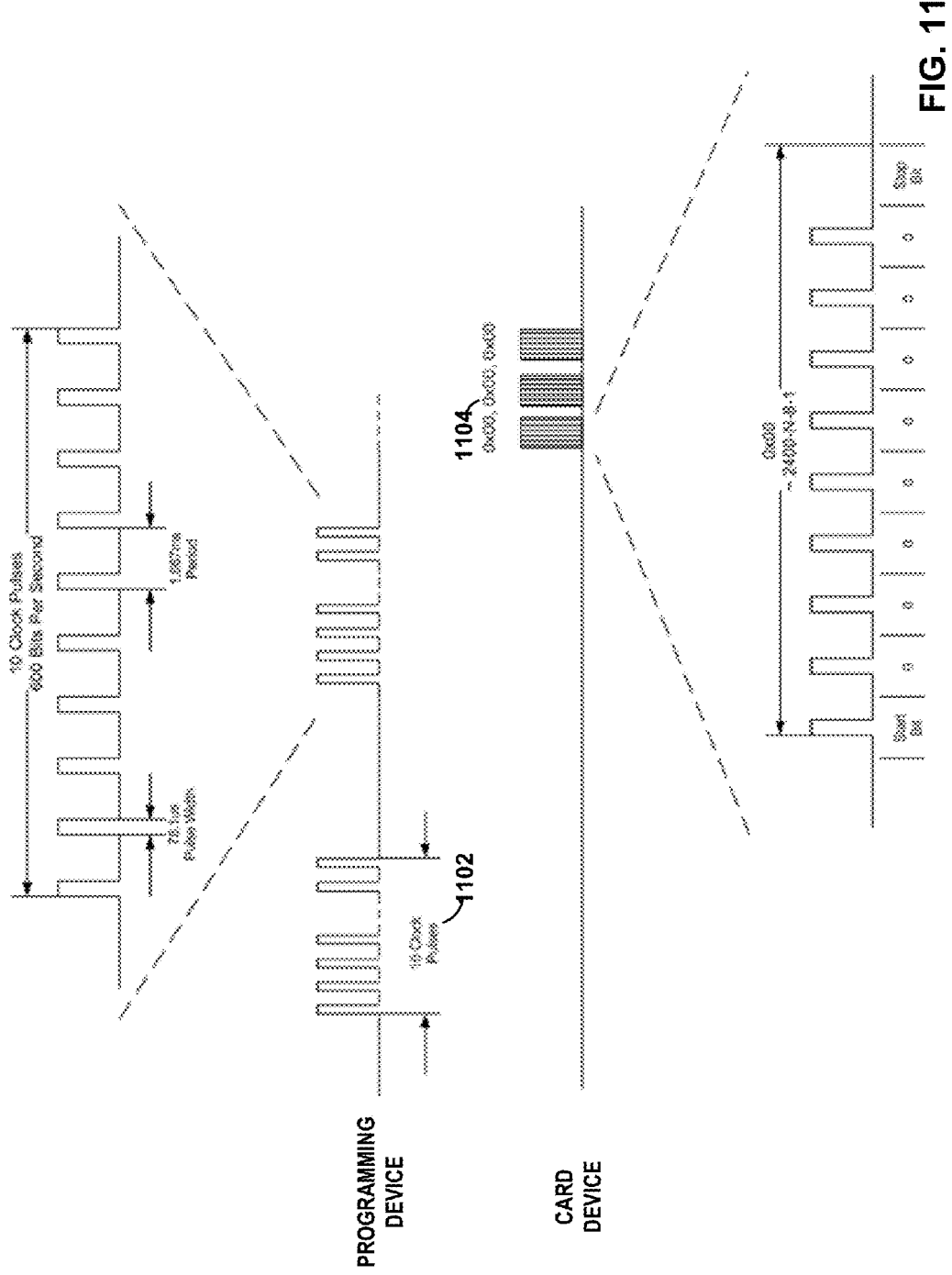
FIG. 11 is an illustration of communications constructed in accordance with the principles of the present invention.

FIG. 11 shows an initialization sequence and a response to the initialization sequence. A programming device may transmit initialization sequence 1102 to a client device. In so doing, a client device may be awakened from a low-power (e.g., sleep) mode of operation. For example, the initialization sequence may be provided to input ports of a processor of the client device, which may cause an interrupt to occur within the processor to transition the client device into a normal mode of operation. Once active, the client device may respond with response 1104. If the client device does not respond with response 1104 within a timeout period (e.g., 100 mS), the programming device may resend initialization sequence 1102.

The programming device may receive response 1104 from the client device. In so doing, the programming device may ascertain a communication rate (e.g., transmission clock timing) that may be used by the client device to transmit response 1104. The programming device may adjust its communication timing to be compatible with the timing characteristics of the client device and the transfer of personalization data (e.g., messages) may commence.

Upon receipt of a message, the client device may evaluate the validity of the message. A client device may also evaluate a CRC that may be transmitted with the message. If the message validity and CRC are evaluated favorably, the client device may accept the message and may acknowledge receipt of the message. If either of the message or CRC are evaluated unfavorably, the client device may not respond at all.

If the programming device receives an acknowledgment from the client device, the programming device may proceed to send additional messages. However, if after a timeout period (e.g., 30 ms) the client device has not yet responded, the programming device may assume that a communication error has occurred and may not attempt resending messages to the client device.

The programming device may try to resend any unacknowledged message. If after a resend, the client device still has not acknowledged, the programming device may report an error condition and the client device may be marked as a suspected defect.

Data exchanged between a programming device and a client device may observe communication timeout rules. Inter-Byte timeouts may be tolerated, such that a maximum delay (e.g., 5 mS) between consecutive bytes in a message may be permitted. If more than a maximum timeout delay elapses between consecutively transmitted bytes, a client device may assume an error condition has occurred and return to a low-power (e.g., sleep) condition. In so doing, no data may be saved within the client device and the entire personalization session may be ignored.

Inter-Message timeouts may be tolerated, such that a maximum delay (e.g., 30 mS) between consecutive messages during a personalization sequence may be permitted. If more than a maximum timeout delay elapses between messages, the client device may assume an error condition has occurred and return to a low-power (e.g., sleep) condition. In so doing, no data may be saved within the client device and the entire personalization session may be ignored.

Figure 12:
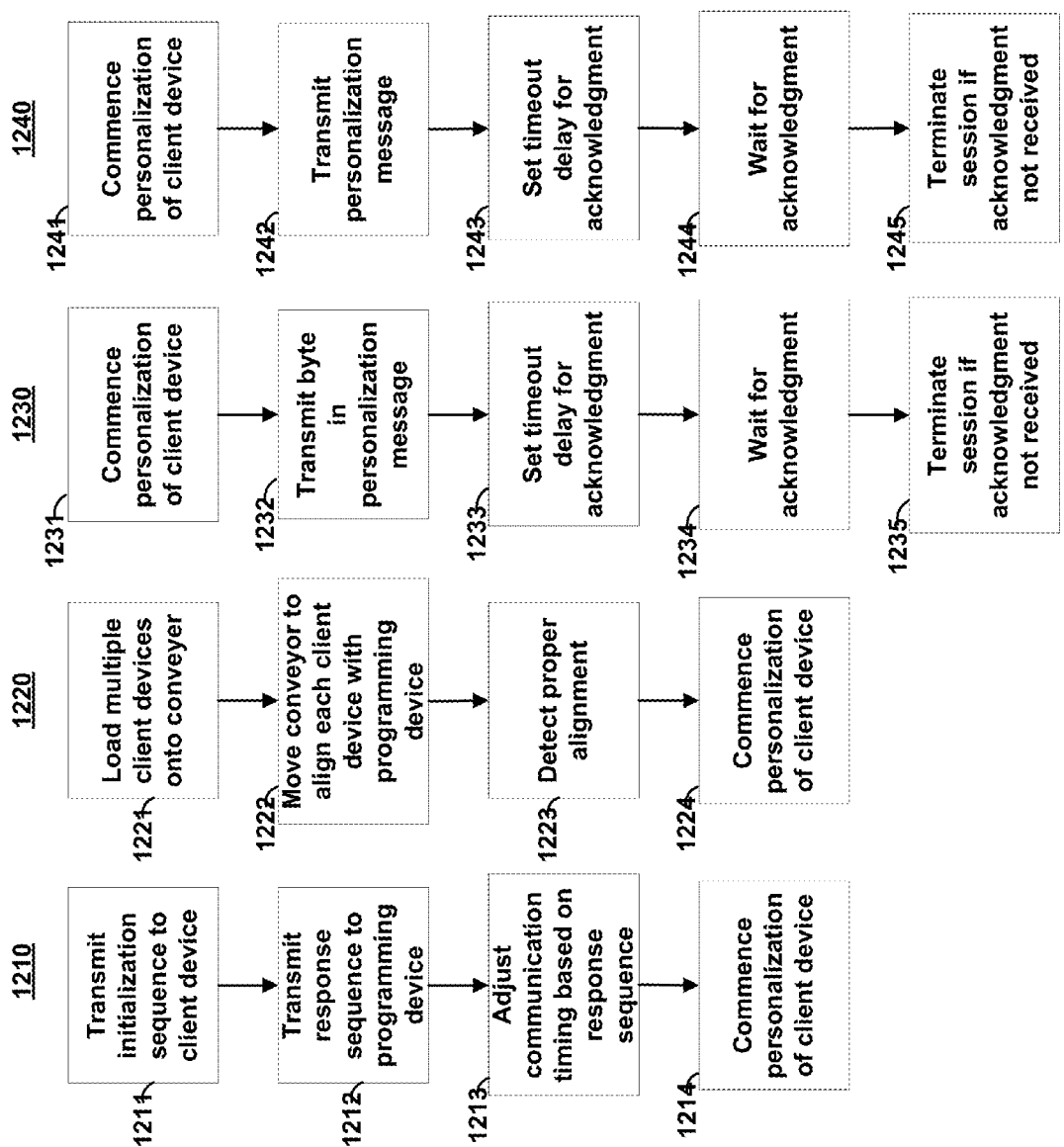
FIG. 12 is an illustration of process flow charts constructed in accordance with the principles of the present invention.

FIG. 12 shows sequences 1210 through 1240. Sequence 1210 may include, for example, transmitting an initialization sequence from a programming device to a client device (e.g., as in step 1211), transmitting a response sequence from a client device to a programming device (e.g., as in step 1212), adjusting communication timing of the programming device based upon the response sequence transmitted by the client device (e.g., as in step 1213), and commencing a personalization sequence of the client device (e.g., as in step 1214).

Sequence 1220 may include, for example, loading multiple client devices onto one or more conveyors (e.g., as in step 1221), moving the conveyor to align each client device with a corresponding programming device (e.g., as in step 1222), detecting a proper alignment of each client device with a respective programming device (e.g., as in step 1223), and commencing a personalization sequence of the client device (e.g., as in step 1224).

Sequence 1230 may include, for example, commencing a personalization sequence of a client device (e.g., as in step 1231), transmitting a byte of a personalization message from a programming device to a client device (e.g., as in step 1232), setting a timeout delay to receive an acknowledgment from the client device (e.g., as in step 1233), waiting for the acknowledgment from the client device (e.g., as in step 1234), and terminating the personalization session if the acknowledgment is not received from the client device before the timeout delay expires.

Sequence 1240 may include, for example, commencing a personalization sequence of a client device (e.g., as in step 1241), transmitting a personalization message from a programming device to a client device (e.g., as in step 1242), setting a timeout delay to receive an acknowledgment from the client device (e.g., as in step 1243), waiting for the acknowledgment from the client device (e.g., as in step 1244), and terminating the personalization session if the acknowledgment is not received from the client device before the timeout delay expires.

Persons skilled in the art will appreciate that the present invention is not limited to only the embodiments described. Instead, the present invention more generally involves dynamic information. Persons skilled in the art will also appreciate that the apparatus of the present invention may be implemented in other ways then those described herein. All such modifications are within the scope of the present invention, which is limited only by the claims that follow.

What is claimed is:

1. A system comprising:
a plurality of cards on a conveyor, each of said plurality of cards including a first infrared communication component; and
a programming device arranged in proximity to said conveyor, said programming device including a second infrared communication component,
wherein said conveyor is operable to align each of said plurality of cards within an infrared programming distance of said programming device, said conveyor operable to reduce velocity for programming of said plurality of cards.

2. The system of claim 1, wherein said first infrared communication component includes a transmitter and a receiver.

3. The system of claim 1, wherein said first infrared communication component includes a transmitter operating at a first frequency and a receiver operating at a second frequency.

4. The system of claim 1, wherein said first infrared communication component includes a transmitter operating at a first frequency and a receiver operating at said first frequency, wherein said operation of said transmitter is at a different time with respect to said operation of said receiver.

5. The system of claim 1, wherein said first infrared communication component is disabled after programming is complete.

6. The system of claim 1, wherein each of said plurality of cards is in a low-power state prior to being programmed.

7. The system of claim 1, wherein each of said plurality of cards is awakened from a low-power state based on an initialization signal received from said programming device.

8. The system of claim 1, wherein each of said plurality of cards provides a response based on an initialization signal received from said programming device and said programming device adjusts communication timing based on said response.

9. The system of claim 1, wherein each of said plurality of cards receives personalization data from said programming device that is stored locally to said programming device.

10. The system of claim 1, wherein each of said plurality of cards receives personalization data from said programming device that is stored remotely to said programming device.

11. The system of claim 1, wherein each of said plurality of cards receives personalization data that is remote to said programming device, said personalization data being provided by a remote server over a network connection between said programming device and said remote server.

12. The system of claim 1, wherein each of said plurality of cards receives personalization data, said personalization data including at least one track of magnetic stripe data.

13. A method comprising:
loading a plurality of cards onto a transport mechanism;
moving said transport mechanism to align each of said plurality of cards with a programming device;
detecting an alignment of each of said plurality of cards with said programming device; and
transmitting light signals from said programming device to program each of said plurality of cards.

14. The method of claim 13, wherein each of said plurality of cards are aligned within 5 mm of said programming device.

15. The method of claim 13, wherein each of said plurality of cards are aligned within 1 mm of said programming device.

16. The method of claim 13, wherein said transport mechanism is moved forward to align each of said plurality of cards with said programming device.

17. The method of claim 13, wherein said transport mechanism is moved backward to align each of said plurality of cards with said programming device.

18. The method of claim 13, wherein said light signals are representative of magnetic stripe data.

19. The method of claim 13, wherein said light signals are representative of magnetic stripe data, said magnetic stripe data being downloaded into said programming device from a remote server.

\* \* \* \* \*